(12) United States Patent
Jin et al.

(10) Patent No.: US 10,622,876 B2
(45) Date of Patent: Apr. 14, 2020

(54) ELECTRIC DRIVE APPARATUS, CHOPPER, DC MOTOR, AND ELECTRIC DEVICE

(71) Applicant: UNIVERSITY OF SHANGHAI FOR SCIENCE AND TECHNOLOGY, Shanghai (CN)

(72) Inventors: Aijuan Jin, Shanghai (CN); Shaolong Li, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 0 days.

(21) Appl. No.: 16/471,012

(22) PCT Filed: Dec. 26, 2017

(86) PCT No.: PCT/CN2017/118757
§ 371 (c)(1),
(2) Date: Jun. 19, 2019

(87) PCT Pub. No.: WO2018/121548
PCT Pub. Date: Jul. 5, 2018

(65) Prior Publication Data
US 2019/0319523 A1    Oct. 17, 2019

(30) Foreign Application Priority Data

Dec. 28, 2016 (CN) .......................... 2016 1 1236236
May 3, 2017 (CN) .......................... 2017 1 0304284
May 3, 2017 (CN) .......................... 2017 1 0305173

(51) Int. Cl.
*H02K 13/10* (2006.01)
*H02K 23/36* (2006.01)
(Continued)

(52) U.S. Cl.
CPC ............. *H02K 23/36* (2013.01); *H02K 13/10* (2013.01); *H02K 23/08* (2013.01); *H02M 3/155* (2013.01); *H02P 7/292* (2013.01)

(58) Field of Classification Search
CPC ......... H02K 13/10; H02K 23/08; H02K 23/36
See application file for complete search history.

(56) References Cited

U.S. PATENT DOCUMENTS 3,733,506 A * 5/1973 Jaffe ........................ H02K 3/16
310/198
5,202,599 A * 4/1993 Kao ....................... H02K 23/28
310/154.47

(Continued)

FOREIGN PATENT DOCUMENTS

| CN | 101902199 | 12/2010 |
|---|---|---|
| CN | 103312095 | 9/2013 |

(Continued)

OTHER PUBLICATIONS

First Examination Report in Chinese Application No. 201710304284.7 issued by CNIPA, dated Oct. 31, 2018.

(Continued)

*Primary Examiner* — Dang D Le
(74) *Attorney, Agent, or Firm* — Zhu Lupkowski LLP

(57) ABSTRACT

An electric drive apparatus includes a DC motor for driving the electric device; a DC power source for outputting constant-voltage DC power to the DC motor; and a chopper for converting the constant-voltage DC power into variable-voltage DC power according to a driving signal and providing the variable-voltage DC power to the DC motor. The DC motor has 2j armature winding branches, each of which consists of m windings, 2j×m commutator segments connected to the windings, and two brush sets respectively (Continued)

connected to two power line sets of the DC motor and in contact with the commutator segments.

20 Claims, 5 Drawing Sheets

(51) Int. Cl.
*H02K 23/08* (2006.01)
*H02M 3/155* (2006.01)
*H02P 7/292* (2016.01)

(56) References Cited

U.S. PATENT DOCUMENTS

| | | | |
|---|---|---|---|
| 6,346,756 B1 * | 2/2002 | Ishikawa | H02K 23/30 310/188 |
| 2002/0130579 A1 | 9/2002 | Moroto | |

FOREIGN PATENT DOCUMENTS

| | | |
|---|---|---|
| CN | 106602947 | 4/2017 |
| CN | 106655924 | 5/2017 |
| CN | 106849784 | 6/2017 |
| CN | 106899245 | 6/2017 |
| CN | 106899246 | 6/2017 |
| CN | 106911272 | 6/2017 |
| CN | 206323319 | 7/2017 |
| CN | 107070325 | 8/2017 |
| CN | 107086830 | 8/2017 |
| CN | 107086831 | 8/2017 |

OTHER PUBLICATIONS

First Examination Report in Chinese Application No. 201710305173.8 issued by CNIPA, dated Sep. 29, 2018.
International Search Report in PCT/CN2017/118757, issued by ISA, dated Mar. 27, 2018.
Written Opinion of the International Search Report in PCT/CN2017/118757, issued by ISA, dated Mar. 27, 2018.

* cited by examiner

ELECTRIC DRIVE APPARATUS, CHOPPER, DC MOTOR, AND ELECTRIC DEVICE

TECHNICAL FIELD

The present invention belongs to the field of DC motors, and especially relates to an electric drive apparatus, chopper, DC motor and electric device comprising the electric drive apparatus.

BACKGROUND

With the increase of haze days and duration in all big cities, the exhaust emission, management of our country for fuel-burning equipment is increasingly strict; the fuel-burning equipment is mostly prohibited in closed indoor working environment; moreover, fuel is a non-renewable source, and will be exhausted after several decades. Therefore, the electric devices using electricity as the energy are more and more popular with manufacturers and consumers, such as electric vehicles, electric tools and indoor electric forklift. The electric device produces little pollution and provides electric energy through renewable energy sources. In addition, compared with fuel-burning equipment, it has the advantages of high energy utilization rate, simple structure, small noise, good dynamic performance and high portability. In the situation that the fuel resource is increasingly strained, it is deeply significant for national defense security to greatly develop the electric drive devices, especially high-power electric drive devices.

With the advantages of simple structure, reliable operation, light weight and low price, AC motors, especially asynchronous motors, are widely used. However, the AC motors have the disadvantages of small starting torque, high starting current, poor speed regulation smoothness, large vibration, loud noise and complex control algorithm. Even if the best control algorithm is adopted, the higher harmonic still exists in motors, resulting in the motor performance inferior to that of DC motors at starting, braking, debugging and low speed. Therefore, it is still preferable to install the electric device with a DC motor where there are a high performance requirement for electric devices, such as household variable-frequency air conditioners, passenger elevators and electric vehicles.

The two-brush DC motor shown in FIG. 2 is taken as an example. In the two-brush DC motor control system as shown in FIG. 2, the controller controls the ON and OFF of the power switch tube of the chopper bridge arm unit through the driving signal from the driving portion to obtain the output DC voltage with controllable voltage magnitude and polarity, and loads the output DC voltage into the armature winding of the DC motor. In the whole process, the controller controls the displacement, speed, torque, etc. of the motor by various control strategies.

With the increased loads of the electric drive apparatus and electric drive device, the input power of the motor increases accordingly. When the DC voltage at the input end of the chopper cannot increase with the load increase because of various reasons, the input current of the motor increases certainly; that is to say, the output current of the chopper increases certainly, and the current flowing through the power switch tube of the chopper increases certainly. Therefore, to ensure the system can work properly, the maximum output current of the power switch tube must increase as well.

However, with the influence of various conditions, the power switch tube which can carry the high working current required by the high-power motor is expensive, and sometimes, there is no such satisfactory power switch tube at all due to the restriction of manufacturing process. FIG. 3 is the diagram of connection relation between the common high-current DC motor and chopper in the prior art. FIG. 3 shows that a parallel current sharing technology is adopted for the power switch tube of the chopper, and the line current of the DC motor is jointly carried by j power switch tubes connected in parallel. In theory, the current value flowing through each power switch tube is 1/j of the current of the DC motor; that is to say, j low-current power switch tubes connected in parallel jointly carry the high current of the DC motor.

When the power switch tubes are fully on and fully off, the consistency of their working characteristics is generally good, which can ensure all power switch tubes equally share the high current of the motor when they are fully on, producing a good current sharing effect; when they are fully off, no current flows. However, in the ON and OFF process of the power switch tubes, it is difficult to ensure the consistency of their working characteristics. To ensure normal working, the power switch tubes with an extremely high consistency will be carefully selected from a large number of power switch tubes, resulting in high use cost. The more the power switch tubes connected in parallel, the sharper the cost increase becomes. Furthermore, even if these selected power switch tubes show a high consistency in the testing process before use, the high consistency cannot be kept all the time in the using process with the influence of working environment and device aging.

With the influence of various factors, as the power switch tubes are converted from an OFF state into an ON state, if the low-current power switch tubes connected in parallel cannot turn on at the same time, which will cause the current sharing failing, the high current of the motor will flow through the single power switch tube turned on in advance, resulting in damage to that power switch tube; similarly, as the power switch tubes are converted from an ON state into an OFF state, if the low-current power switch tubes connected in parallel cannot turn off at the same time, which will cause current sharing failing, the high current of the motor will flow through the power switch tube turned off at last, resulting in damage to that power switch tube.

With the increase of power switch tubes connected in parallel, it is more difficult to ensure the consistency of their switching characteristics, resulting in a worse current sharing effect in the switching process. Thereby, the higher the possibility of damage, the more serious the problem becomes. It is very difficult to overcome the problem of the high-current motor, because the parallel current sharing technology cannot ensure any of power switch tubes connected in parallel can turn on at the same time and turn off at the same time, which seriously affects and restricts the increased current value of the high-current motor.

Further, in the case that the battery is supplied by a DC power source, the battery voltage is far lower than that of the AC rectifier power source, because the voltage magnitude is constrained, resulting in a higher current value and a more serious problem. That seriously affects the development of electric tools, electric vehicles (especially heavy-duty electric vehicles), electric ships, and even electric combat vehicles, electric warships and electric drive aircraft carriers in national defense.

SUMMARY

The present invention is to solve the above problems. By providing a chopper with k bridge arm portions each comprising j bridge arm units, a DC motor comprising 2j armature winding branches and 2j power lines, and an electric drive apparatus and electric device comprising the chopper and DC motor, the chopper can also provide a high current value for the DC motor in the case of using ordinary low-current power switch tubes.

For this purpose, the technical solutions below are adopted by the present invention:

<Structure 1>

The present invention provides a DC electric drive apparatus, provided in an electric device to drive the electric device, and comprising: a DC motor, for driving the electric device; a DC power source, for outputting constant-voltage DC power to the DC motor; and a chopper, for converting constant-voltage DC power into variable-voltage DC power according to a driving signal and providing variable-voltage DC power to the DC motor. It is characterized in that: wherein, the DC motor has 2j armature winding branches each composed of m windings, 2j×m commutator segments connected to the windings, and two brush sets respectively connected to two power line sets of the DC motor and in contact with the commutator segments; each of the brush sets comprises j brushes; each of the power line sets comprises j power lines; the chopper has k bridge arm portions each comprising j bridge arm units connected to j power lines of one power line set in one-to-one correspondence; each of bridge arm units outputs a current for two armature winding branches through correspondingly connected power lines, and the armature winding branches generate output torques to drive the electric device; both j and m are positive integers not less than 2, and k is 1 or 2.

The DC electric drive apparatus provided in the present invention also has the following characteristics: wherein, when k is 2, each bridge arm unit comprises one chopper bridge arm and two freewheeling diodes, the chopper bridge comprises two power switch tubes connected in series, and each power switch tube is connected to one freewheeling diode respectively in an inverse-parallel mode.

The DC electric drive apparatus provided in the present invention also has the following characteristics: wherein, when k is 1, the bridge arm unit comprises one chopper bridge arm and two freewheeling diodes, the chopper bridge comprises two power switch tubes connected in series, each power switch tube is connected to one freewheeling diode respectively; and the other power line set is connected to the output end of DC power source in an inverse-parallel mode.

The DC electric drive apparatus provided in the present invention also has the following characteristics: wherein, when k is 1, the bridge arm unit comprises one power switch tube and one freewheeling diode connected in a series-opposing mode; and the other power line set is connected to the output end of DC power source.

The DC electric drive apparatus provided in the present invention also has the following characteristics that it further comprises: a controller and a driving portion, wherein, the controller receives the command signal corresponding to the operation of the DC motor, and calculates and outputs the control signal according to the command signal; the driving portion generates the driving signal according to the control signal; and the chopper provides DC power of transformation for the DC motor under the action of the driving signal.

The DC electric drive apparatus provided in the present invention also has the following characteristics: wherein, when the power switch tubes have the same maximum output current I1, and the maximum current of the DC motor is Imax, the number of 2j armature winding branches meets the following condition: $j \geq Imax \div I1$.

The DC electric drive apparatus provided in the present invention also has the following characteristics: wherein, the DC power source has one DC unit or a plurality of DC units connected to the bridge arm units in one-to-one correspondence; and the DC unit is the DC power source obtained from AC power source passing through the rectifier and filter.

The DC electric drive apparatus provided in the present invention also has the following characteristics: wherein, the connection method of armature winding is lap winding; and the DC motor comprises a main pole providing a working magnetic field for the armature winding branches, and the excitation method for the main pole is any one of permanent magnet, separate excitation, series excitation, shunt excitation, and compound excitation.

The DC electric drive apparatus provided in the present invention also has the following characteristics: wherein, the armature winding branches are separately installed on one armature winding or a plurality of armature windings; the armature is the rotor of the DC motor; and the power switch tube is the semi-controlled or full-controlled device. The semi-controlled device is an ordinary thyristor, and the full-controlled device is any one of P-MOSFET, GTO, IGCT, IGBT, GTR and GCT.

<Structure 2>

Further, the present invention also provides a chopper, respectively connected to a DC power source driving an electric device and comprising 2j armature winding branches, 2j×m commutator segments, 2j brushes, and 2j power lines, and to a DC power source (outputting constant-voltage DC power to the DC motor); used for converting constant-voltage DC power into variable-voltage DC power according to a driving signal and providing variable-voltage DC power to the DC motor. It is characterized in that it comprises: k bridge arm portions, wherein, each of the bridge arm portions comprises bridge arm units connected to j power lines of one power line set in one-to-one correspondence; each of the bridge arm units outputs a current for two armature winding branches through correspondingly connected power lines, and the armature winding branches generate output torques to drive the electric device; and both j and m are positive integers not less than 2, and k is 1 or 2.

The chopper provided in the present invention also has the following characteristics: wherein, when k is 2, each bridge arm unit comprises one chopper bridge arm and two freewheeling diodes, the chopper bridge comprises two power switch tubes connected in series, and each power switch tube is connected to one freewheeling diode respectively in an inverse-parallel mode.

The chopper provided in the present invention also has the following characteristics: wherein, when k is 1, the bridge arm unit comprises one chopper bridge arm and two freewheeling diodes, the chopper bridge comprises two power switch tubes connected in series, and each power switch tube is connected to one freewheeling diode respectively in an inverse-parallel mode; and the other power line set is connected to the output end of DC power supply.

The chopper provided in the present invention also has the following characteristics: wherein, when k is 1, the bridge arm unit comprises one power switch tube and one freewheeling diode connected in a series-opposing mode; and the other power line set is connected to the output end of DC power source.

<Structure 3>

Further, the present invention also provides a DC motor for driving the electric device, connected with the chopper, wherein, the chopper has k bridge arm portions, each comprising j bridge arm units, and each bridge arm unit outputs current. It is characterized in that it comprises: 2j armature winding branches, each composed of m windings connected in series, for generating output torques to drive the electric device; a main pole, providing a working magnetic field for the armature winding branches; a commutator, comprising 2j×m commutator segments respectively connected to windings; 2j brushes evenly arranged on the commutator, corresponding, to the main pole, each coming in contact with at least one commutator segment, and connected to a power line; and 2j power lines, with one end connected to the bridge arm unit and the other end connected to a brush, providing current for two armature winding branches; wherein, both j and m are positive integers not less than 2, and k is 1 or 2.

<Structure 4>

Further, the present invention also provides an electric device, characterized in that it comprises: an electric drive apparatus, wherein, the electric drive apparatus is that as described in <Structure 1>.

FUNCTIONS AND EFFECTS OF THE INVENTION

According to the electric drive apparatus, electric device, chopper and DC motor provided in the present invention, the DC motor has 2j armature winding branches each composed of m windings, 2j×m commutator segments connected to the windings, and two brush sets respectively connected to two power line sets of the DC motor and in contact with the commutator segments; each of the brush sets comprises j brushes; each of the power line sets comprises j power lines; the chopper has k bridge arm portions each comprising j bridge arm units connected to j power lines of one power line set in one-to-one correspondence; each of bridge arm units outputs a current for two armature winding branches through correspondingly connected power lines, and the armature winding branches generate output torques to drive the electric device. Thus, the maximum current of each power line is only related to the connected bridge arm unit and two armature winding branches. Namely, the maximum output current of the power switch tube in the bridge arm unit is related to the two corresponding armature winding branches, but not related to the power switch tubes in other bridge arm units and the number of armature winding branches of the DC motor. Therefore, even if the power switch tubes in different bridge arm units have inconsistent switching characteristics, they do not affect each other; with the increase in the number of armature winding branches, brushes, power lines and bridge arm units, the current of the DC motor as well as the working currents of the chopper and the DC electric drive apparatus also increase and can be infinitely great in theory.

When the same driving signal drives the corresponding power switch tubes on the chopper to turn on or off simultaneously, even if the tubes cannot turn on or off simultaneously due to the inconsistency of switching characteristics, no damage will be caused to the single power switch tube due to over-current, and the inconsistency of switching characteristics only will cause that the torques generated from the corresponding two armature windings of each power line are inconsistent at the moment of switching, but the influence of torque inconsistency is little and can be ignored, because the duration of ON and OFF of power switch tubes is short, and the motor and its load are a relatively large inertial object. Therefore, the present invention not only retains the original mature control algorithm of the chopper and mature manufacturing technology of the DC motor, but also reduces the requirements for the performance consistency of power switch tubes. The use of ordinary power switch tubes can meet the requirements and avoid the consumption of lots of human and financial resources caused by careful selection for power switch tubes with extremely high consistency from a great quantity of power switch tubes.

In addition, the electric drive device of the present invention can break the monopoly and blockade of foreign countries to the high-current chopper and high-current drive device so that the electric drive device not only can replace the fuel engine with large pollution, slow starting speed and low energy utilization rate to be used for heavy-duty locomotives that cannot be equipped with motors, such as trucks, bulldozers and excavators, but also can be used for electric combat vehicles, electric warships and electric drive aircraft carriers that require high currents militarily, achieving domestic production of high-current electric drive apparatus. Moreover, the performance is superior to the AC motor drive apparatus.

Thus, the electric drive apparatus of the present invention has the advantages of reasonable and simple structure design, low cost, superior performance, low vibration and noise, stable and reliable operating, long service life, strong adaptive capacity to environment, etc.

DETAILED DESCRIPTION

The detailed description of the preferred embodiments is described in combination with the figures.

Embodiment 1

Figure 1:
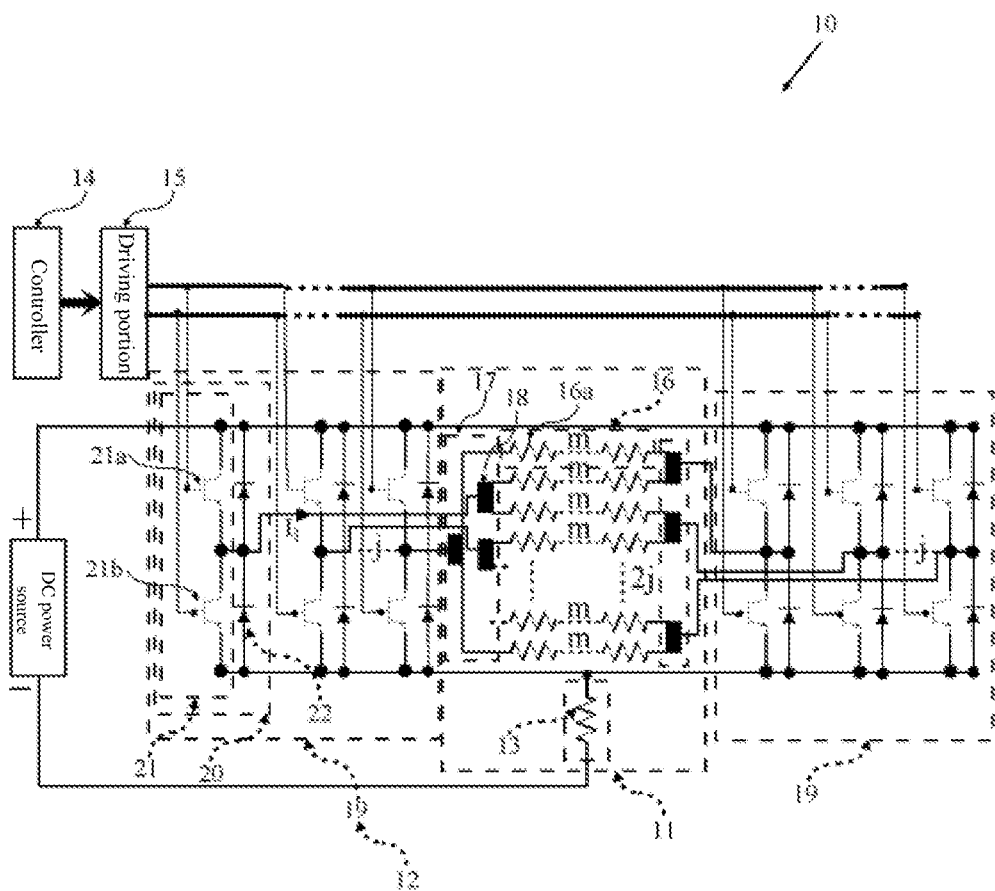
FIG. 1 is the circuit structure diagram of the electric drive apparatus in Embodiment 1 of the present invention.
Figure 2:
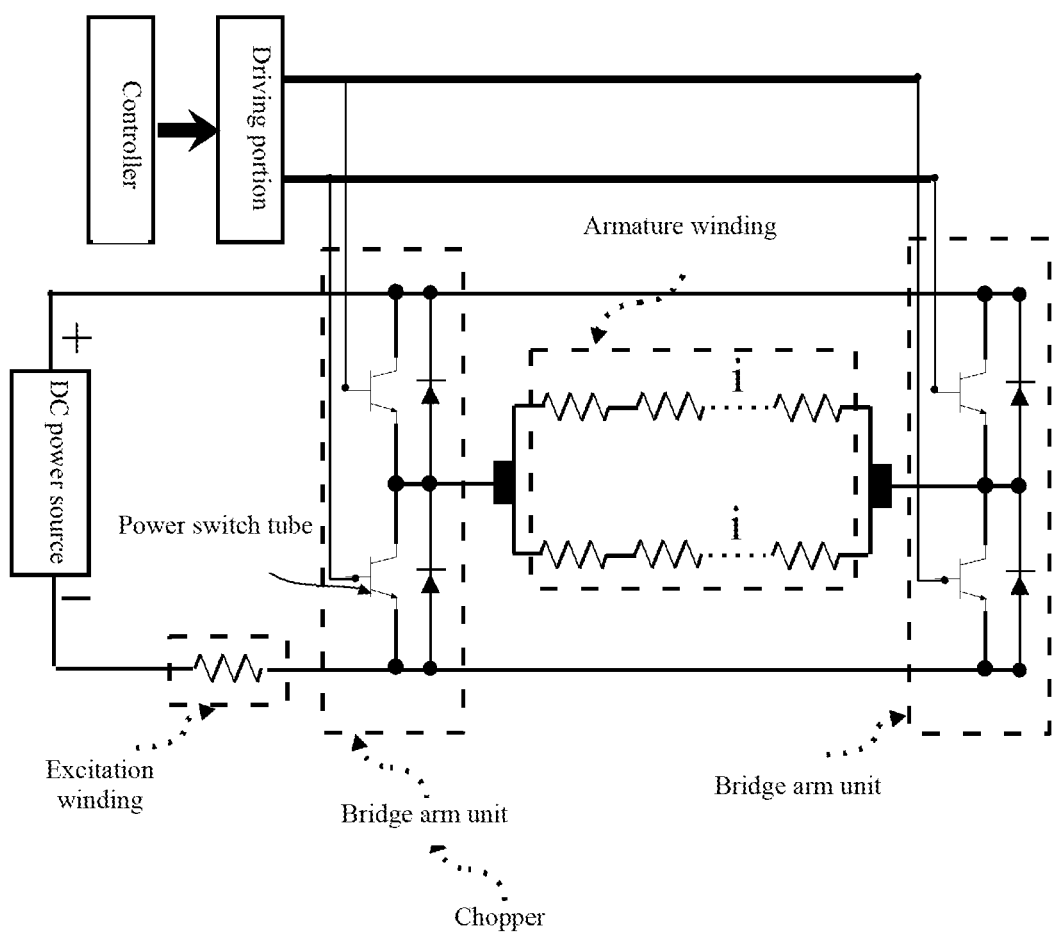
FIG. 2 is the circuit structure diagram of the low-current DC motor and chopper in the prior art.
Figure 3:
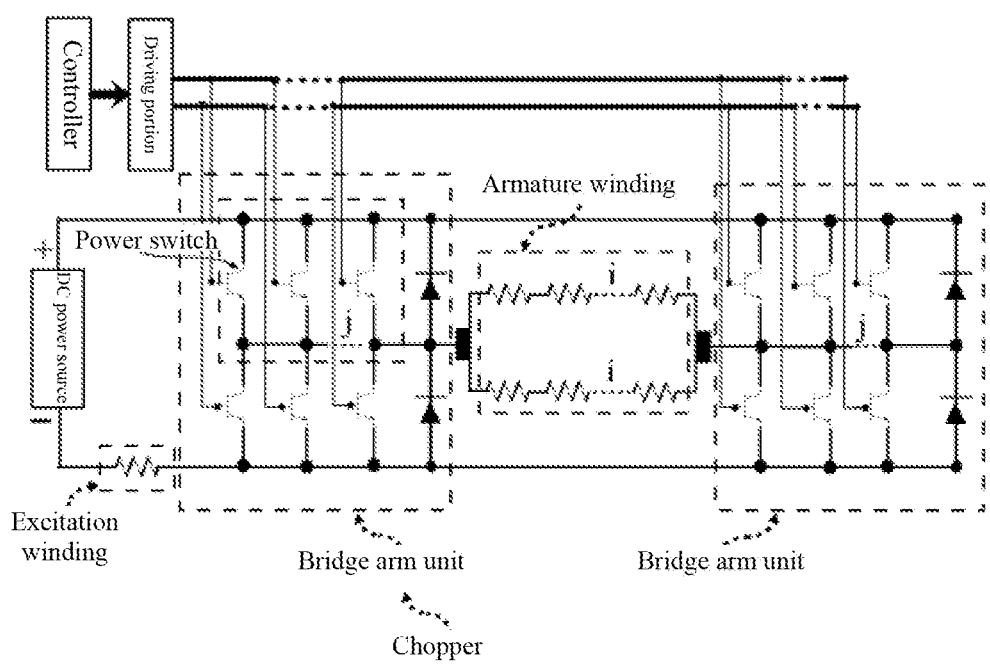
FIG. 3 is the circuit structure diagram of the high-current DC motor and chopper in the prior art.

FIG. 1 is the circuit structure diagram of the electric drive apparatus in Embodiment 1.

The electric drive apparatus 10 is used in electric devices, such as electric tools, quadcopters, electric vehicles, electric ships, industrial electric forklift and electric military equipment to drive electric devices. As shown in FIG. 1, the electric drive apparatus 10 comprises DC motor 11, a DC power source, chopper 12, controller 14 and driving portion 15.

The DC motor 11 is used to drive the electric device. The DC motor 11 has a main pole (not shown in the figure), 2j armature winding branches 15, a commutator (not shown in the figure) and two brush sets 17.

The main pole provides a working magnetic field for all armature winding branches. The excitation method for the main pole is permanent magnet, separate excitation, series excitation, shunt excitation or compound excitation. If the excitation method for the main pole is separate excitation, the winding of separate excitation supplies power separately, and is independent of armature windings. If the excitation method for the main pole is shunt excitation, the winding of shunt excitation is connected with the separate chopper as well as the DC power source and the driving portion corresponding to armatures. In this embodiment, the excitation winding 13 is used for the main pole. The series excitation is adopted for the excitation winding 13.

The armature winding branch 16 is separately installed on one or a plurality of armature windings, and the armature is the rotor of the DC motor. The armature winding branch 16 is composed of m windings 16a winding round the armature, and m is a positive integer not less than 2. The connection method for the winding of armature winding branch 16 is lap winding. During the normal working, the currents of all armature branches do not affect each other, and are mutually independent. The armature winding branches generate output torques according to line currents provided by bridge arm units to drive the electric device.

The commutator comprises 2j×m commutator segments respectively connected to windings.

The two brush sets 17 are divided into two sets according to different magnetic polarities of the main pole corresponding to the spatial position, and these two sets are respectively connected to two sets of power lines of the DC motor with different magnetic polarities and in contact with commutator segments. Each brush set comprises j brushes 18. 2j brushes 18 are evenly distributed on the commutator and corresponding to the spatial position of the main pole of the DC motor. Each brush is in contact with at least one commutator segment. The brushes 18 from the same set are evenly distributed along the peripheral direction of the motor, while those from different sets are in spatial positions corresponding to gaps between two adjacent brushes 18 from the same set. In this embodiment, the brush 18 is narrow and slightly smaller than the commutator in size. In the DC motor 11, each brush 18 at least can be in contact with more than one commutator segments at the same time.

The DC power source is used to output constant-voltage DC power to the DC motor 11, and provide constant-voltage DC power for the chopper 12. The DC power source is obtained from AC power source passing through the rectifier and filter. In this embodiment, the battery is selected as the DC power source.

The chopper 12 converts constant-voltage DC power into variable-voltage DC power with the controllable average voltage according to a driving signal sent by the controller 14 through the driving portion 15, and provides variable-voltage DC power for the DC motor 11. In this embodiment, the chopper is a bridge reversible chopper.

The chopper 12 has two bridge arm portions 19 respectively corresponding to two brush sets. Each bridge arm portion 19 comprises j bridge arm units 20 in one-to-one correspondence to brushes.

The bridge arm unit 20 comprises one chopper bridge arm 21 and two freewheeling diodes 22, and provides the line current for the corresponding brush.

The chopper bridge arm 21 comprises the upper bridge arm power switch tube 21a and the lower bridge arm power switch tube 21b in series connection.

The upper bridge arm power switch tube 21a and the lower bridge arm power switch tube 21b are respectively connected to one freewheeling diode 22 in parallel. The upper bridge arm power switch tube 21a and the lower bridge arm power switch tube 21b have the same predetermined maximum output current which is an important parameter of power switch tubes. Only under this current value, power switch tubes are possible to stably operate. If working currents exceed this current value, power switch tubes will be broken down due to over-current and thus damaged.

The upper bridge arm power switch tube 21a or the lower bridge arm power switch tube 21b is the semi-controlled or full-controlled device. The semi-controlled device is an ordinary thyristor, and the full-controlled device is any one of P-MOSFET, GTO, IGCT, IGBT, GTR and GCT.

The controller 14 receives the command signal corresponding to the operation of the DC motor 11, and calculates and outputs the control signal according to the command signal.

The driving portion 15 generates the driving signal according to the control signal.

When the maximum output currents of upper bridge arm power switch tube 21a and lower bridge arm power switch tube 21b are I1, and the maximum current of the DC motor is Imax, the number of 2j armature winding branches 16 meets the following condition: j>Imax÷I1. j is a positive integer not less than 2.

j is determined in the following way of thinking: When the maximum current Imax of the DC motor 11 is known, firstly select appropriate power switch tubes, determine the maximum output current of the single element, and then calculate according to the above formula and round up to an integer to obtain j.

Divide the motor armature winding group into armature winding branches comprising 2j brushes. If the number of brushes is only 2, the short circuit to one or two adjacent commutator segments can be considered for brushes following the equivalence principle to reduce the number of effective windings of the motor, thus reducing the influence of motor output power. Re-design armature windings in the arrangement of lap winding, and define the number of brushes.

Certainly, j also can be determined not based on I1, but by directly setting j and then selecting appropriate power switch tubes, provided that the single bridge arm unit 21 can stably provide line currents for two armature winding branches.

Functions and Effects of Embodiment 1

According to the electric drive apparatus, electric device, chopper and DC motor provided in Embodiment 1, the DC motor has 2j armature winding branches each composed of m windings, 2j×m commutator segments connected to the windings, and two brush sets respectively connected to two power line sets of the DC motor and in contact with the commutator segments; each of the brush sets comprises j brushes; each of the power line sets comprises j power lines; the chopper has k bridge arm portions each comprising j bridge arm units connected to j power lines of one power line set in one-to-one correspondence; each of bridge arm units outputs a current for two armature winding branches through correspondingly connected power lines, and the armature winding branches generate output torques to drive the electric device. Thus, the maximum current of each power line is only related to the connected bridge arm unit and two armature winding branches. Namely, the maximum output current of the power switch tube in the bridge arm unit is related to the two corresponding armature winding branches, but not related to the power switch tubes in other bridge arm units and the number of armature winding branches of the DC motor. Therefore, even if the power switch tubes in different bridge arm units have inconsistent switching characteristics, they do not affect each other; with the increase in the number of armature winding branches, brushes, power lines and bridge arm units, the current of the DC motor as well as the working currents of the chopper and the DC electric drive apparatus also increase and can be infinitely great in theory.

When the same driving signal drives the corresponding power switch tubes on the chopper to turn on or off simultaneously, even if the tubes cannot turn on or off simultaneously due to the inconsistency of switching characteristics, no damage will be caused to the single power switch tube due to over-current, and the inconsistency of switching characteristics only will cause that the torques generated from the corresponding two armature windings of each power line are inconsistent at the moment of switching, but the influence of torque inconsistency is little and can be ignored, because the duration of ON and OFF of power switch tubes is short, and the motor and its load are a relatively large inertial object. Therefore, Embodiment 1 not only retains the original mature control algorithm of the chopper and mature manufacturing technology of the DC motor, but also reduces the requirements for the performance consistency of power switch tubes. The use of ordinary power switch tubes can meet the requirements and avoid the consumption of lots of human and financial resources caused by careful selection for power switch tubes with extremely high consistency from a great quantity of power switch tubes.

In addition, the electric drive device of Embodiment 1 can break the monopoly and blockade of foreign countries to the high-current chopper and high-current drive device so that the electric drive device not only can replace the fuel engine with large pollution, slow starting speed and low energy utilization rate to be used for heavy-duty locomotives that cannot be equipped with motors, such as trucks, bulldozers and excavators, but also can be used for electric combat vehicles, electric warships and electric drive aircraft carriers that require high currents militarily, achieving domestic production of high-current electric drive apparatus. Moreover, the performance is superior to the AC motor drive apparatus.

Thus, the electric drive apparatus of Embodiment 1 has the advantages of reasonable and simple structure design, low cost, superior performance, low vibration and noise, stable and reliable operating, long service life, strong adaptive capacity to environment, etc.

Embodiment 2

The electric drive apparatus 210 is used in electric devices, such as electric tools, quadcopters, electric vehicles, electric ships, industrial electric forklift and electric military equipment to drive electric devices.

Figure 4:
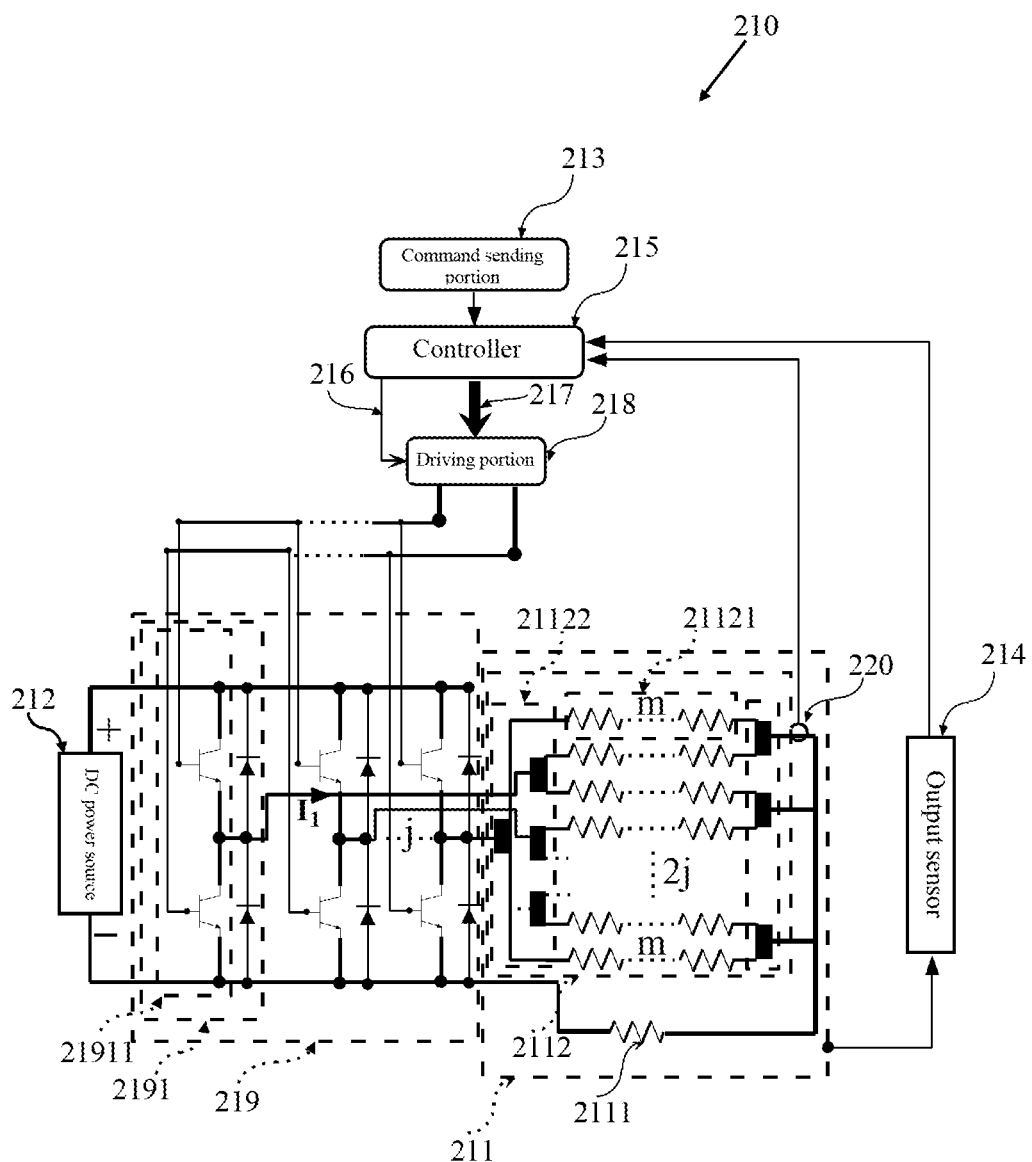
FIG. 4 is the circuit structure diagram of the electric drive apparatus in Embodiment 2 of the present invention.

FIG. 4 is the circuit structure diagram of the electric drive apparatus in Embodiment 2.

As shown in FIG. 4, the electric drive apparatus 210 comprises DC motor 211, DC power source 212, command sending portion 213, output sensor 214, controller 215, driving portion 218, chopper 219 and current sensor 220.

The DC motor 211 is used to drive the electric device. The DC motor 211 has the excitation winding 2111 of the main pole (not shown in the figure) and at least one armature 2112. In the embodiment, the DC motor has one armature 2112. The armature 2112 is the rotor of the DC motor.

The main pole provides a working magnetic field for the armature 2112. The excitation method for the main pole is permanent magnet, separate excitation, series excitation, shunt excitation or compound excitation. If the excitation method for the main pole is separate excitation, the excitation winding of separate excitation is controlled separately, and is independent of armature windings. If the excitation method for the main pole is shunt excitation, the power of excitation winding of shunt excitation is supplied by the separate chopper, DC power source with the same voltage as DC power source 212, and separate driving unit. In this embodiment, the series excitation is adopted for the main pole.

The armature 2112 comprises a rotor core (not shown in the figure), 2j armature winding branches 21121, a commutator (not shown in the figure) and two brush sets 21122.

The commutator comprises 2j×m commutator segments.

The armature winding branch 21121 is separately installed on the rotor core of armature 2112. The armature winding branch 21121 is composed of m windings winding around the rotor core, and m is a positive integer not less than 2. The connection method for the winding of armature winding branch 21121 is lap winding. During the normal working, the currents of all armature branches do not affect each other, and are mutually independent. The armature winding branches 21121 generate output torques according to line currents provided by bridge arm units to drive the electric device.

The two brush sets 21122 are divided into two sets according to different polarities of the main pole corresponding to the spatial position, and these two sets are respectively connected to two sets of power lines of the DC motor 211 and in contact with commutator segments. Each brush set comprises j mutually independent brushes. 2j brushes are evenly distributed on the commutator and corresponding to the spatial position of the main pole of the DC motor. Each brush is in contact with at least one commutator segment. One set of brushes are evenly distributed along the peripheral direction of the motor, and the other set of brushes are installed in spatial positions at the middle of two adjacent brushes from different sets. In this embodiment, the brush is narrow and slightly smaller than the commutator in size. In this embodiment, each brush at least can be in contact with at least one commutator segment.

The DC power source 212 is used to output constant-voltage DC power to the DC motor 211, and provide DC power for the chopper 219. The DC power source 212 is the rectifier power source obtained from AC power source passing through the rectifier and filter. In this embodiment, the battery pack is selected as the DC power source 212.

The command sending portion 213 sends the command signal corresponding to the displacement, speed or torque output by the DC motor 211.

The output sensor 214 tests the displacement, speed or torque output by the DC motor 211, and outputs the corresponding output feedback signal. The output feedback signal is received by the controller 215.

The current sensor 220 tests the line current value of the brush lead-out line, and outputs the corresponding current feedback signal. The current feedback signal is received by the controller 215.

The controller 215 calculates operating control signal 216 of the driving portion and motor control signal 217 according to the command signal of command sending portion 213, the output feedback signal of output sensor 214 and the current feedback signal of current sensor 220.

The driving portion 218 gets into the working state under the control of operating control signal 216, and generates the driving signal to drive the operation of chopper 219 according to the motor control signal 217.

The chopper 219 converts constant-voltage DC power into variable-voltage DC power with the controllable average voltage under the action of the driving signal sent by the driving portion 218, and provides variable-voltage DC power for the DC motor 211. In this embodiment, the chopper 219 is a half bridge chopper.

The chopper 219 has 1 bridge arm portion comprising j bridge arm units 2191 in one-to-one correspondence to j brushes of one brush set. Each bridge arm unit 2191 comprises one chopper bridge arm 21911 and two freewheeling diodes, jointly providing the line current for the corresponding brush.

The chopper bridge arm 21911 comprises the upper bridge arm power switch tube and the lower bridge arm power switch tube in series connection. That is to say, the upper bridge arm power switch tube and the lower bridge arm power switch tube are respectively connected to one freewheeling diode in an inverse-parallel mode. The upper bridge arm power switch tube and the lower bridge arm power switch tube have the same predetermined maximum output current which is an important parameter of power switch tubes. Only under this current value, power switch tubes are possible to stably operate. If working currents exceed this current value, power switch tubes will be broken down due to over-current and thus damaged.

The upper bridge arm power switch tube or the lower bridge arm power switch tube is the semi-controlled or full-controlled device. The semi-controlled device is an ordinary thyristor, and the full-controlled device is any one of P-MOSFET, GTO, IGCT, IGBT, GTR and GCT. In this embodiment, the power switch tube is P-MOSFET.

When the maximum output current of the power switch tube is I1, and the maximum current of the DC motor 211 is Imax, the number of 2j armature winding branches 21121 meets the following condition: j>Imax÷I1. j is a positive integer not less than 2.

j is determined in the following way of thinking: When the maximum current Imax of the DC motor 211 is known, firstly select appropriate power switch tubes, determine the maximum output current of the single element, and then calculate according to the above formula and round up to an integer to obtain j.

Functions and Effects of Embodiment 2

According to the electric drive apparatus and electric device provided in Embodiment 2, the DC motor has 2j armature winding branches each composed of m windings, 2j×m commutator segments connected to the windings, and 2j brushes connected to the chopper and in contact with the commutator segments; the chopper is a half bridge chopper with j mutually independent bridge arm units each comprising one chopper bridge arm and two freewheeling diodes to provide line currents for correspondingly connected brushes through the current output lines, and the chopper bridge comprises two power switch tubes connected in series; each power switch tube is connected to one freewheeling diode in an inverse-parallel mode. Therefore, the line currents output by any two bridge arm units are mutually independent without interference, and the output current of the chopper may linearly increase by increasing the number of bridge arm units and can be infinitely great in theory. Embodiment 2 not only retains the original mature control algorithm of the chopper and mature technology of the DC motor, but also reduces the requirements for the performance consistency of power switch tubes. The use of ordinary power switch tubes can meet the requirements for the high current and avoid the consumption of lots of human and financial resources due to careful selection of switch elements with high consistency from a great quantity of power switch tubes.

In addition, the electric drive device of Embodiment 2 can break the monopoly and blockade of foreign countries, to the high-current drive device so that the electric drive device not only can replace the fuel engine with large pollution, slow starting speed and low energy utilization rate to be used for heavy-duty locomotives that cannot be equipped with motors, such as trucks, bulldozers and excavators, but also can be used for electric combat vehicles, electric warships and electric drive aircraft carriers that require high currents militarily, achieving domestic production of low-voltage and high-current electric drive apparatus. Moreover, the system performance is superior to the AC motor drive apparatus.

In addition, under the irreversible working environment, the half bridge chopper used in Embodiment 2 has the advantages of simpler circuits, fewer devices, higher reliability and lower cost than the full bridge chopper.

Thus, the electric drive apparatus of Embodiment 2 has the advantages of reasonable and simple structure design, low cost, small heat-producing capacity, stable, safe and reliable operating performance, long service life, etc.

Embodiment 3

The electric drive apparatus 310 is used in electric devices, such as electric tools, quadcopters, electric vehicles, electric ships, industrial electric forklift and electric military equipment to drive electric devices.

Figure 5:
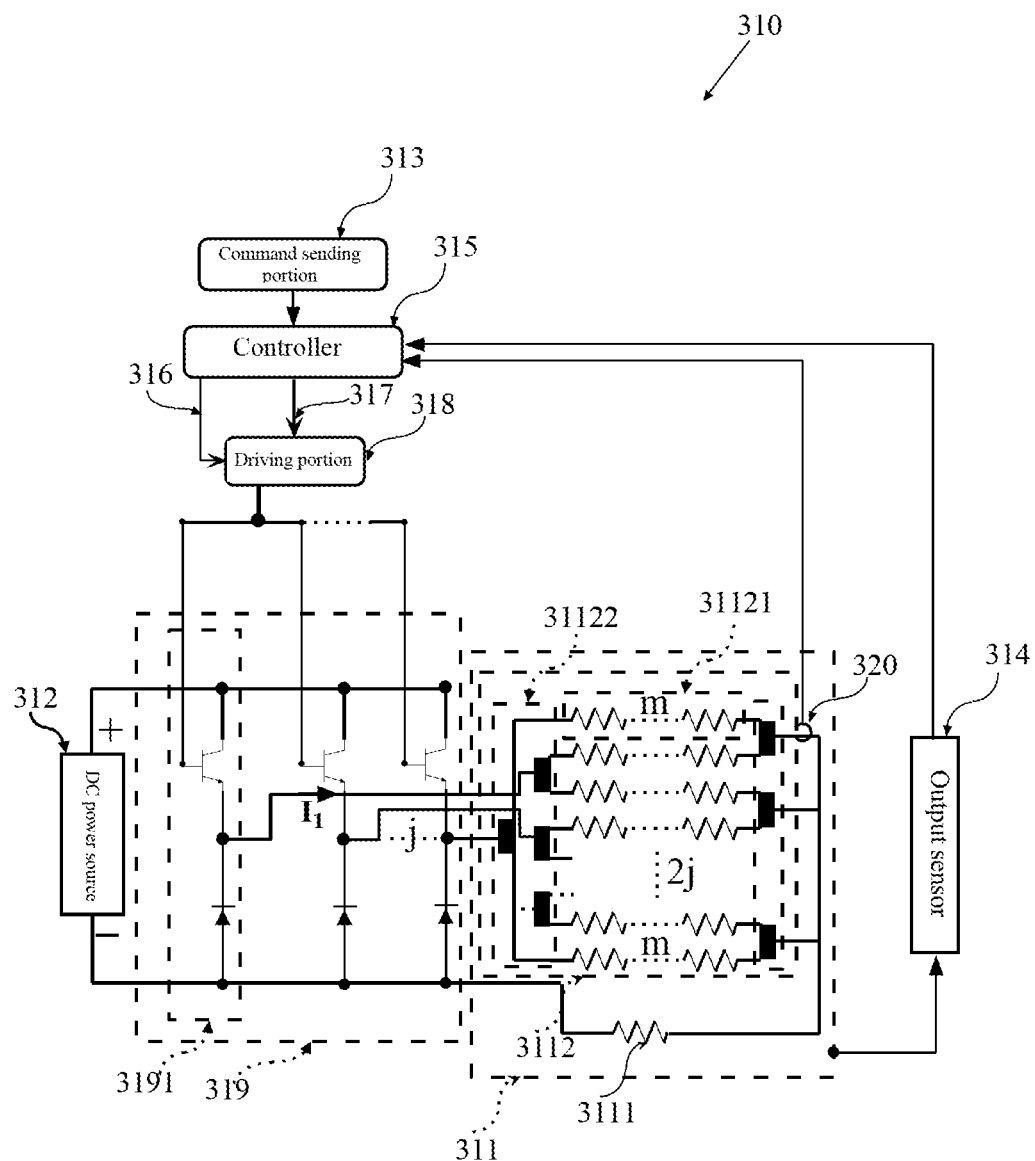
FIG. 5 is the circuit structure diagram of the electric drive apparatus in Embodiment 3 of the present invention.

FIG. 5 is the circuit structure diagram of the electric drive apparatus in Embodiment 3.

As shown in FIG. 5, the electric drive apparatus 310 comprises DC motor 311, DC power source 312, command sending portion 313, output sensor 314, controller 315, driving portion 318, chopper 319 and current sensor 320.

The DC motor 311 is used to drive the electric device. The DC motor 311 has the excitation winding 3111 of the main pole (not shown in the figure) and at least one armature 3112. In the embodiment, the DC motor has one armature 3112. The armature 3112 is the rotor of the DC motor.

The main pole provides a working magnetic field for the armature 3112. The excitation method for the main pole is permanent magnet, separate excitation, series excitation, shunt excitation or compound excitation. If the excitation method for the main pole is separate excitation, the excitation winding of separate excitation is controlled separately, and is independent of armature windings. If the excitation method for the main pole is shunt excitation, the power of excitation winding of shunt excitation is supplied by the separate chopper, DC power source with the same voltage as DC power source 312, and separate driving portion. In this embodiment, the series excitation is adopted for the main pole.

The armature 3112 comprises a rotor core (not shown in the figure), 2j armature winding branches 31121, a commutator (not shown in the figure), and two brush sets 31122.

The commutator comprises 2j×m commutator segments.

The armature winding branch 31121 is separately installed on the rotor core of armature 3112. The armature winding branch 31121 is composed of m windings winding around the rotor core, and in is a positive integer not less than 2. The connection method for the winding of armature winding branch 31121 is lap winding. During the normal working, the currents of all armature branches do not affect each other, and are mutually independent. The armature winding branches 31121 generate output torques according to line currents provided by bridge arm units to drive the electric device.

The two brush sets 31122 are divided into two sets according to different polarities of the main pole corresponding to the spatial position, and these two sets are respectively connected to two sets of power lines of the DC motor 311 and in contact with commutator segments. Each brush set comprises j mutually independent brushes. 2j brushes are evenly distributed on the commutator and corresponding to the spatial position of the main pole of the DC motor. Each brush is in contact with at least one commutator segment. One set of brushes are evenly distributed along the peripheral direction of the motor, and the other set of brushes are installed in spatial positions at the middle of two adjacent brushes from different sets. In this embodiment, the brush is narrow and slightly smaller than the commutator in size. In this embodiment, each brush at least can be in contact with at least one commutator segment.

The DC power source 312 is used to output constant-voltage DC power to the DC motor 211, and provide DC power for the chopper 219. The DC power source 312 is a rectifier power source obtained from battery pack or AC power source passing through the rectifier and filter. In this embodiment, the battery pack is selected as the DC power source 312.

The command sending portion 313 sends the command signal corresponding to the displacement, speed or torque output by the DC motor 311.

The output sensor 314 tests the displacement, speed or torque output by the DC motor 311, and outputs the corresponding output feedback signal. The output feedback signal is received by the controller 315.

The current sensor 320 tests the line current value of the brush lead-out line, and outputs the corresponding current feedback signal. The current feedback signal is received by the controller 315.

The controller 315 calculates the operating control signal 316 of the driving portion and motor control signal 317 according to the command signal of command sending portion 313, the output feedback signal of output sensor 314, and the current feedback signal of current sensor 320.

The driving portion 318 gets into the working state under the control of operating control signal 316, and generates the driving signal to drive the operation of chopper 319 according to the motor control signal 317.

The chopper 319 converts constant-voltage DC power into variable-voltage DC power with the controllable average voltage under the action of the driving signal sent by the driving portion 318, and provides variable-voltage DC power for the DC motor 11. In this embodiment, the chopper 319 is a single-tube chopper. The single-tube chopper is a buck chopper, boost chopper or boost-buck chopper. In this embodiment, the chopper 319 is a buck chopper.

The chopper 319 has 1 bridge arm portion comprising j bridge arm units 3191 in one-to-one correspondence to j brushes of one brush set. Each bridge arm unit 3191 comprises one power switch tube and one freewheeling diode connected in a series-opposing mode with the power switch tube, jointly providing the line current for the corresponding brush.

The power switch tube is the semi-controlled or full-controlled device. The semi-controlled device is an ordinary thyristor, and the full-controlled device is any one of P-MOSFET, GTO, IGCT, IGBT, GTR and GCT. In this embodiment, the power switch tube is P-MOSFET.

When the maximum output current of the power switch tube is I1, and the maximum current of the DC motor 211 is Imax, the number of 2j armature winding branches 31121 meets the following condition: $j > Imax \div I1$. j is a positive integer not less than 2.

j is determined in the following way of thinking: When the maximum current Imax of the DC motor 311 is known, firstly select appropriate power switch tubes, determine the maximum output current of the single element, and then calculate according to the above formula and round up to an integer to obtain j.

Functions and Effects of Embodiment 3

According to the electric drive apparatus and electric device provided in Embodiment 3, the DC motor has 2j armature winding branches each composed of m windings, 2j×m commutator segments connected to the windings, and 2j brushes connected to the chopper and in contact with the commutator segments; the chopper is a single-tube chopper with j mutually independent bridge arm units, and each of the bridge arm units is respectively connected with a brush, and both j and m are positive integers not less than 2. Therefore, the line currents output by any two bridge arm units are mutually independent without interference, and the output current of the chopper may linearly increase by increasing the number of bridge arm units and can be infinitely great in theory. Embodiment 3 not only retains the original mature control algorithm of the chopper and mature technology of the DC motor, but also reduces the requirements for the performance consistency of power switch tubes. The use of ordinary power switch tubes can meet the requirements for the high current and avoid the consumption of lots of human and financial resources due to careful selection of switch elements with high consistency from a great quantity of power switch tubes.

In addition, the electric drive device of Embodiment 3 can break the monopoly and blockade of foreign countries to the high-current drive device so that the electric drive device not only can replace the fuel engine with large pollution, slow starting speed and low energy utilization rate to be used for heavy-duty locomotives that cannot be equipped with motors, such as trucks, bulldozers and excavators, but also can be used for electric combat vehicles, electric warships and electric drive aircraft carriers that require high currents militarily, achieving domestic production of low-voltage and high-current electric drive apparatus. Moreover, the system performance is superior to the AC motor drive apparatus.

In addition, under the environment with no need of operating circuits of reverse motion and regenerative braking, the single-tube chopper used in Embodiment 3 has the advantages of simpler circuits, fewer devices, higher reliability and lower cost than half bridge and full bridge choppers.

Thus, the electric drive apparatus of Embodiment 3 has the advantages of reasonable and simple structure design, low cost, small heat-producing capacity, stable, safe and reliable operating performance, long service life, etc.

In addition, the DC power source has one DC unit or a plurality of DC units connected to the bridge arm units in one-to-one correspondence, and the DC unit is the DC power source obtained from AC power source passing through the rectifier and filter.

When the DC power source has the DC units connected to the bridge arm units in one-to-one correspondence, the output current of each DC unit is smaller than the total current of DC power source. The connecting line between the DC unit and the chopper, the connecting piece between the connecting line and the DC unit, and the connecting piece between the connecting line and the chopper have low requirements for contact resistance and insulation, which not only reduces the production difficulty and cost, but also improves the system reliability and safety.

When the DC power unit is the battery pack and has the battery units connected to the bridge arm units in one-to-one correspondence, the battery cells in the battery units do not need parallel technology, and can meet the requirements only by adopting series technology, which eliminates the battery equalization problems caused by a plurality of battery cells in parallel, and avoids the cost generated by the reduction of inconsistency of a plurality of battery cells. For power supply, the overall performance degradation of the battery caused by parallel connection is reduced, and energy density, power, performance, duration and safety are improved in case of the same quantity of battery cells, because a plurality of series batteries with relative small capacity replace the single series-parallel battery pack with large capacity.

When the driving portion has a plurality of drivers connected to the bridge arm units in one-to-one correspondence, each driver receives the operating control signal and the motor control signal sent by the controller, and gets into the working state or the stopping state under the action of the operating control signal. In the working state, the driving signal is generated according to the motor control signal. Each driver is connected with one bridge arm unit, and each bridge arm unit is connected with one power line. Each driver is correspondingly connected with a bridge arm unit, a power line, a brush and two armature winding branches. When any one of driver, bridge arm unit, power line, brush or armature winding branch fails, the controller of this embodiment outputs the operating control signal to stop the corresponding driver, thus shielding and isolating the damaged driver, bridge arm unit, power line, brush or armature winding branch, which avoids further expansion of the fault, ensures the electric drive apparatus and electric device can continue to operate normally or operate with light load, and greatly reduces the accident occurrence rate of electric device, especially the electric device under high-speed operation.

In the above embodiment, the brush is narrow, but it also can be as wide as the brush of the present invention.

In the above embodiment, the winding of series excitation is used for the main pole, and the excitation winding is connected with the chopper in series. As the electric drive apparatus of the present invention, the main pole can also use the excitation method of permanent magnet; by means of separate excitation, the excitation winding is supplied by the separate DC power source with the adjustable voltage; by means of shunt excitation, the excitation winding is supplied by the separate chopper, and connected with the DC power source and the driving portion; the excitation winding may also be a compound winding containing series excitation and shunt excitation.

In the above embodiment, the current sensor in the electric drive apparatus is an inner ring sensor. As the electric drive apparatus of the present invention, the inner ring sensor portion can test the physical parameter of at least one of voltage, current, speed and torque.

The above contents show and describe the basic principle, major characteristics and advantages of the present invention. The technicians of this industry shall understand that the present invention is not limited by above embodiments. The above embodiments and specification only describes the principle of the present invention. Under the premise of not breaking away from the spirit and scope of the present invention, various changes and improvements may be made to the present invention, and such changes and improvements shall fall into the claimed protection scope of the present invention. The protection scope claimed by the present invention is defined by the attached claims and their equivalents.

The invention claimed is:

1. An electric drive apparatus, provided in an electric device to drive the electric device, and comprising:
   a DC motor, for driving the electric device;
   a DC power source, for outputting constant-voltage DC power to the DC motor; and
   a chopper, for converting the constant-voltage DC power into variable-voltage DC power according to a driving signal and providing the variable-voltage DC power to the DC motor;
   characterized in that:
   wherein, the DC motor has 2j armature winding branches each consisting of m windings, 2j×m commutator segments connected to the windings, and two brush sets respectively connected to two power line sets of the DC motor and in contact with the commutator segments;
   each of the brush sets comprises j brushes;
   each of the power line sets comprises j power lines;
   the chopper has k bridge arm portions, and each of the bridge arm portions comprises j bridge arm units connected to j power lines of one power line set in one-to-one correspondence, and each of the bridge arm units provides a current for two armature winding branches through correspondingly connected power lines;
   the armature winding branches generate an output torque to drive the electric device; and
   both j and m are positive integers not less than 2, and k is 1 or 2.

2. The electric drive apparatus according to claim 1, characterized in that:
   wherein, when k is 2, each bridge arm unit comprises one chopper bridge arm and two freewheeling diodes, the chopper bridge comprises two power switch tubes connected in series, and each power switch tube is connected to one freewheeling diode in an inverse-parallel mode.

3. An electric device, characterized in that it comprises:
   an electric drive apparatus,
   wherein, the electric drive apparatus is as described in claim 2.

4. The electric drive apparatus according to claim 1, characterized in that:
   wherein, when k is 1, each bridge arm unit comprises one chopper bridge arm and two freewheeling diodes, the chopper bridge comprises two power switch tubes connected in series, and each power switch tube is connected to one freewheeling diode in an inverse-parallel mode; and
   the other power line set is connected to the output end of the DC power source.

5. An electric device, characterized in that it comprises:
   an electric drive apparatus,
   wherein, the electric drive apparatus is as described in claim 4.

6. The electric drive apparatus according to claim 1, characterized in that:

wherein, when k is 1, the bridge arm unit comprises one power switch tube and one freewheeling diode by series-opposing connection; and the other power line set is connected to the output end of the DC power source.

7. An electric device, characterized in that it comprises: an electric drive apparatus, wherein, the electric drive apparatus is as described in claim 6.

8. The electric drive apparatus according to claim 1, characterized in that it further comprises:

a controller and a driving portion, wherein, the controller receives the command signal corresponding to the operation of the DC motor, and calculates and outputs the control signal according to the command signal;

the driving portion generates the driving signal according to the control signal; and the chopper provides DC power of transformation for the DC motor under the action of driving signal.

9. An electric device, characterized in that it comprises: an electric drive apparatus, wherein, the electric drive apparatus is as described in claim 8.

10. The electric drive apparatus according to claim 1, characterized in that:

wherein, when the power switch tubes have the same maximum output current I1 and the maximum current of DC motor is Imax, the number of 2j armature winding branches meets the following condition:

$j > I_{max} \div I_1$.

11. An electric device, characterized in that it comprises: an electric drive apparatus, wherein, the electric drive apparatus is as described in claim 10.

12. The electric drive apparatus according to claim 1, characterized in that:

wherein, the DC power source has a DC unit or a plurality of DC units connected to the bridge arm units in one-to-one correspondence; and the DC unit is a battery or DC power source obtained from AC power source passing through the rectifier and filter.

13. The electric drive apparatus according to claim 1, characterized in that:

wherein, the connection method of the armature winding is lap winding; and the DC motor comprises a main pole providing a working magnetic field for the armature winding branches, and the excitation method of the main pole is any one of permanent magnet, separate excitation, series excitation, shunt excitation, and compound excitation.

14. The electric drive apparatus according to claim 1, characterized in that:

wherein, the armature winding branch is separately installed on one armature winding or a plurality of armature windings;

the armature is the rotor of the DC motor; and the power switch tube is the semi-controlled or full-controlled device, the semi-controlled device is an ordinary thyristor, and full-controlled device is any one of power MOSFET, GTO, IGCT, IGBT, GTR, and GCT.

15. An electric device, characterized in that it comprises: an electric drive apparatus, wherein, the electric drive apparatus is as described in claim 1.

16. A chopper, respectively connected to a DC motor (driving an electric device and comprising 2j armature winding branches, 2j×m commutator segments, 2j brushes, and 2j power lines), and to a DC power source (outputting constant-voltage DC power to the DC motor); used for converting the constant-voltage DC power into variable-voltage DC power according to a driving signal and providing the variable-voltage DC power to the DC motor; characterized in that it comprises:

k bridge arm portions, wherein, each of the bridge arm portions comprises bridge arm units connected to j power lines of one power line set in one-to-one correspondence;

each of bridge arm units outputs current for two armature winding branches through correspondingly connected power lines, and the armature winding branches generate an output torque to drive the electric device; and both j and m are positive integers not less than 2, and k is 1 or 2.

17. The chopper according to claim 16, characterized in that:

wherein, when k is 2, each bridge arm unit comprises one chopper bridge arm and two freewheeling diodes, the chopper bridge comprises two power switch tubes connected in series, and each power switch tube is connected to one freewheeling diode in an inverse-parallel mode.

18. The chopper according to claim 16, characterized in that:

wherein, when k is 1, each bridge arm unit comprises one chopper bridge arm and two freewheeling diodes, the chopper bridge comprises two power switch tubes connected in series, and each power switch tube is connected to one freewheeling diode in an inverse-parallel mode; and the other power line set is connected to the output end of the DC power source.

19. The chopper according to claim 16, characterized in that:

wherein, when k is 1, the bridge arm unit comprises one power switch tube and one freewheeling diode connected in a series-opposing mode; and the other power line set is connected to the output end of the DC power source.

20. A DC motor for driving the electric device, connected with the chopper, wherein, the chopper has k bridge arm portions, each bridge arm portion comprises j bridge arm units, and each bridge arm unit outputs current; characterized in that it comprises:

2j armature winding branches, each composed of m windings connected in series, for generating an output torque to drive the electric device;

a main pole, providing a working magnetic field for the armature winding branches;

a commutator, comprising 2j×m commutator segments respectively connected to the windings;

2j brushes, evenly arranged on the commutator, corresponding to the main pole, each coming in contact with at least one commutator segment, and each connected to one power line; and 2j power lines, with one end connected to the bridge arm unit and the other end connected to one brush, providing current for two armature winding branches;

wherein, both j and m are positive integers not less than 2, and k is 1 or 2.

\* \* \* \* \*